(12) United States Patent
Claesson et al.

(10) Patent No.: US 8,813,590 B2
(45) Date of Patent: Aug. 26, 2014

(54) COUPLING MECHANISM FOR RELEASABLY INTERCONNECTING A FIRST AND A SECOND MECHANICAL MEMBER AND A LINEAR ACTUATOR EQUIPPED WITH SUCH A COUPLING MECHANISM

(75) Inventors: Pontus Claesson, Helsingborg (SE); Torbjörn Lövgren, Kode (SE)

(73) Assignee: Aktiebolaget SKF, Gothenburg (SE)

( * ) Notice: Subject to any disclaimer, the term of this patent is extended or adjusted under 35 U.S.C. 154(b) by 731 days.

(21) Appl. No.: 12/998,748

(22) PCT Filed: Nov. 18, 2009

(86) PCT No.: PCT/SE2009/000494
§ 371 (c)(1),
(2), (4) Date: Sep. 7, 2011

(87) PCT Pub. No.: WO2010/062235
PCT Pub. Date: Jun. 3, 2010

(65) Prior Publication Data
US 2011/0308342 A1  Dec. 22, 2011

(30) Foreign Application Priority Data
Nov. 25, 2008 (SE) ...................................... 0802476

(51) Int. Cl.
*E05B 15/02* (2006.01)
(52) U.S. Cl.
USPC ............................. 74/89; 292/341.17; 292/97
(58) Field of Classification Search
USPC ........... 74/89; 292/341.17, 97, 100, 108, 221, 292/223, 226, 227, 196, DIG. 37
See application file for complete search history.

(56) References Cited

U.S. PATENT DOCUMENTS

| 2,458,240 A | 1/1949 | Baskerville |
| 2,604,790 A | 7/1952 | Derby et al. |
| 4,076,435 A | 2/1978 | Gueldner |

(Continued)

FOREIGN PATENT DOCUMENTS

FR  2633990 A1  1/1990

*Primary Examiner* — David M Fenstermacher
(74) *Attorney, Agent, or Firm* — Bryan Peckjian; SKF USA Inc. Patent Department

(57) ABSTRACT

The invention refers to coupling mechanism and a linear actuator incorporating such a mechanism for releasably interconnecting first and second mechanical members (1, 2), longitudinally movable relative to each other, a first one of said mechanical members (1) pivotably supporting an end (F) of a first link of a knee link mechanism (3), also incorporating a second link member (3*b*), which first and second link members are pivotally connected to another in a knee joint (E), a control rod (4) pivotally connected to said knee joint (E), the end (D) of the second link member (3*b*) remote from the knee joint (E) being connected to a hook arm (5), the opposite end of which is pivotally supported at a support point (B) stationary positioned relative to said first mechanical member (1), said hook arm (5) having a hook (5*a*) facing said second mechanical member and being in mechanical engagement (A) with a shoulder (6, 6') on said second mechanical member (2) as long as the said knee joint (E) is kept in a substantially stretched position by said control rod (4), which is kept stationary under influence of a holding force exerted in connection to said first mechanical member (1), but which is arranged to displace the knee joint (E), thus that the hook (5*a*) of the hook arm (5) is pulled out from its engagement with the shoulder on the second mechanical member, when the holding force expires or drops under a threshold value.

7 Claims, 4 Drawing Sheets

(56) References Cited

U.S. PATENT DOCUMENTS

| | | | |
|---|---|---|---|
| 6,106,035 A * | 8/2000 | Hetherington | 292/251 |
| 6,595,561 B1 * | 7/2003 | Szablewski et al. | 292/304 |
| 6,669,250 B1 * | 12/2003 | St. Louis | 292/341.11 |
| 2008/0054653 A1 * | 3/2008 | Kraenzle | 292/341.17 |
| 2008/0296917 A1 * | 12/2008 | Giret et al. | 292/341.17 |
| 2009/0115204 A1 * | 5/2009 | Rycroft | 292/341.17 |

* cited by examiner

COUPLING MECHANISM FOR RELEASABLY INTERCONNECTING A FIRST AND A SECOND MECHANICAL MEMBER AND A LINEAR ACTUATOR EQUIPPED WITH SUCH A COUPLING MECHANISM

FIELD OF THE INVENTION

The present invention refers to a coupling mechanism for interconnecting two longitudinally movable mechanical members in an easily releasable manner.

The invention also refers to a linear actuator equipped with such a coupling mechanism.

BACKGROUND OF THE INVENTION

In many mechanical implements where two or more mechanical members are interconnected in a releasable manner, it is required that it shall be possible to release the connection in a simple and efficient manner, whereby also the mechanism shall stay in connected state without causing disconnection unintentionally, and there is also a requirement that the mechanism shall be able to re-connect in a correct manner, for guaranteeing that the mechanism after re-connection will be able to disconnect in a proper manner.

PURPOSE OF THE INVENTION

The main purpose of the invention is to provide a coupling mechanism, which always will guarantee, that the two mechanical members are immediately disconnected, if a holding force acting on a control member will terminate or drop below a predetermined value.

Another purpose of the invention is that the mechanism shall maintain the interconnection between the two mechanical members when the holding force is sufficient, and thereby not cause unintentional disconnection.

Still another purpose of the invention is to guarantee that after disconnection a reconnection will be performed in a proper manner thus that renewed disconnection will again occur when the requirements for that will again come up.

Another purpose is to provide a linear mechanical actuator equipped with a coupling mechanism of this type.

SUMMARY OF THE INVENTION

These and other purposes have been achieved with a coupling mechanism for releasably interconnecting a first and a second mechanical member, which mechanical members are longitudinally movable in relation to each other, a first one of said mechanical members pivotably supporting an end of a first link member of a knee link mechanism, which knee link mechanism incorporates said first link member and a second link member, which first and second link members are pivotally connected to each other in a knee joint, a control rod being pivotally connected to said knee joint, whereas the second link member at its end remote from the knee joint is pivotally connected to a hook arm, the opposite end of which is pivotally supported at a support point stationary positioned relative to said first mechanical member, said hook arm having a hook facing said second mechanical member and being in mechanical engagement with a shoulder on said second mechanical member as long as the said knee joint is uninfluenced by said control rod, which is kept stationary under influence of a holding force exerted in connection to said first mechanical member, but which is arranged to displace the knee joint, thus that the hook of the hook arm is pulled out from its engagement with the shoulder on the second mechanical member, when the holding force expires or drops under a threshold value.

In an embodiment, the holding force is resulting from a friction force between the hook arm and the second mechanical member.

In an embodiment, the holding force is resulting from a force acting on the control rod.

In an embodiment, the holding force is resulting from a combination of a friction force between the hook arm and the second mechanical member, and a force acting on the control rod.

Specific embodiments of the coupling mechanism are defined in the dependent claims.

A linear actuator equipped with a coupling mechanism as claimed in any of the preceding claims is defined in claim 8.

BRIEF DESCRIPTION OF THE ACCOMPANYING DRAWINGS

Hereinafter the invention will be further described with reference to a schematic embodiment illustrated in the accompanying drawings.

DESCRIPTION OF THE PREFERRED EMBODIMENTS

Figure 1:
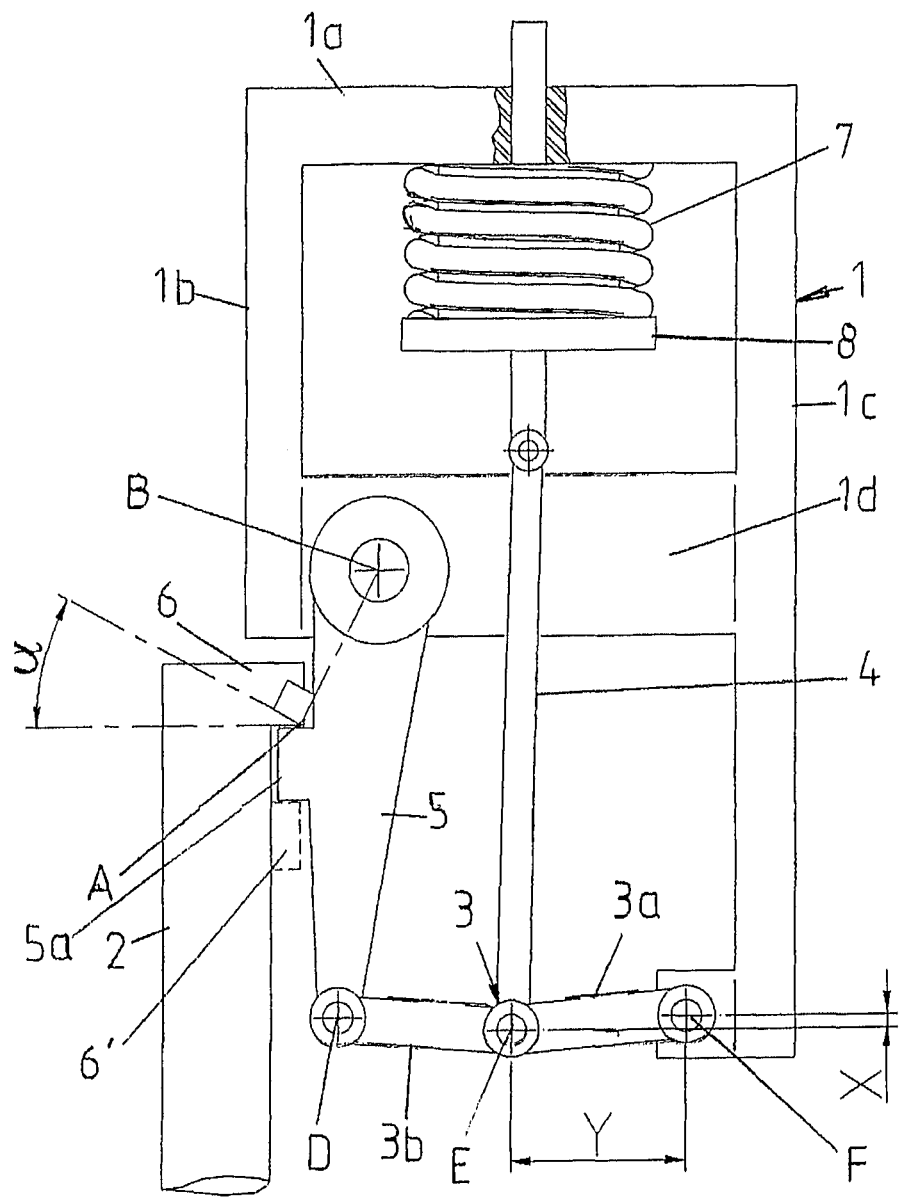
FIG. 1 shows schematically a coupling mechanism according to the invention in a position where a first and a second mechanical member are interconnected.

FIG. 1 illustrates schematically a coupling mechanism in accordance with the present invention for releasably interconnecting a first 1 and a second mechanical member 2, which are longitudinally movable in relation to each other, the first one of said mechanical members 1 pivotably supporting an end F of a first link member 3*a* of a knee link mechanism 3, which knee link mechanism 3 incorporates said first link member 3*a* and a second link member 3*b*, which first and second link members are pivotally connected to another in a knee joint E, a control rod 4 being pivotally connected to said knee joint E, whereas the second link member 3*b* at its end D remote from the knee joint E is pivotally connected to a hook arm 5, the opposite end of which is pivotally supported at a support point B stationary positioned relative to said first mechanical member 1, said hook arm 5 having a hook 5*a* facing said second mechanical member 2 and being in mechanical engagement A with a shoulder 6 on said second mechanical member 2 as long as the said knee joint E is uninfluenced by said control rod 4, which is kept stationary under influence from a holding force exerted in connection to said first mechanical member 1, but which is arranged to displace the knee joint E, thus that the hook 5*a* of the hook arm 5 is pulled out from its engagement with the shoulder 5 on the second mechanical member 2, when the holding force expires or drops under a threshold value.

In the mutual relation illustrated between the hook 5*a* and the shoulder 6 a normal to a line between the support point B for the hook arm 5 and the engagement position A between the hook 5*a* and the shoulder 6 forms an angle α to the plane of the hook 5a. In this embodiment the first and second mechanical members 1, 2 can only be separated in a single linear direction, referred to as the pull direction, i.e. the coupling mechanism can hold a force in separating (pull) direction.

In dash lines is showed an alternative position for the shoulder 6', which in that position can provide to transfer force in the opposite direction, i.e. a "push" force. In an embodiment, the coupling mechanism comprises two shoulders 6, 6' to enable both push and pull.

In the embodiment illustrated, the first mechanical member 1 is designed as a trussed frame having an upper beam 1a, in which is provided a guide for the movable control rod 4, a first frame member 1b and a second frame member 1c connected to the upper beam 1a and projecting perpendicularly from this in a spaced apart mutual relation. The frame also incorporates an intermediate beam 1d substantially parallel with the upper beam 1a and supporting the said hook arm 5, which is pivotably supported about the pivot axle B. The end of the movable control rod 4 remote from the guide in the upper beam 1a is linked to the pivot point E between the two knee link members 3a, 3b, the opposite end of one 3a of which is pivotally connected to a lower portion of said second frame member 1c, situated at a distance below the intermediate beam 1d, whereas the end of the other knee link 3b opposite from the pivot point E is pivotally connected to an end of the hook arm 5.

In normal position, the movable control rod 4 is subjected to a small holding force, whereby the rod 4 is maintained in a position, where the two knee links 3a, 3b are maintained in a substantially stretched out position. Such a small holding force can be effected with aid of different means, such as an electromagnet, a pneumatic or hydraulic actuator or a thermal or electrical fuse or another member which breaks or changes size at a defined threshold value.

In FIG. 1 is shown how the control rod 4 is equipped with a resiliently pre-loaded member, in the embodiment shown a spring 7, which acts between the upper beam 1a and a stop 8 fixedly arranged on the control rod. This resilient member 7 will increase the force by which the control rod 4 will act upon the knee joint E for displacing the knee joint and thereby causing disconnection, when the conditions therefore are the right, i.e. when the holding force acting on the control rod has terminated or dropped under a threshold value. In many cases this extra resilient member is not required. In this embodiment, an electromagnet is located inside the Spring 7. When the electromagnet is activated, it acts upon the stop 8, which in this embodiment is an magnetic plate, and maintains the stop 8 in a stationary position. An advantage with an electromagnet is that if the power supply to the device is cancelled for some reason, it automatically releases the stop 8, and the control rod may be pushed or pulled (for instance by assistance of the spring 7), thus disconnecting the first 1 and second 2 mechanical member. This may be advantageous to use when a reliable and automatic emergency operation of e.g. a linear actuator is wanted.

Figure 2:
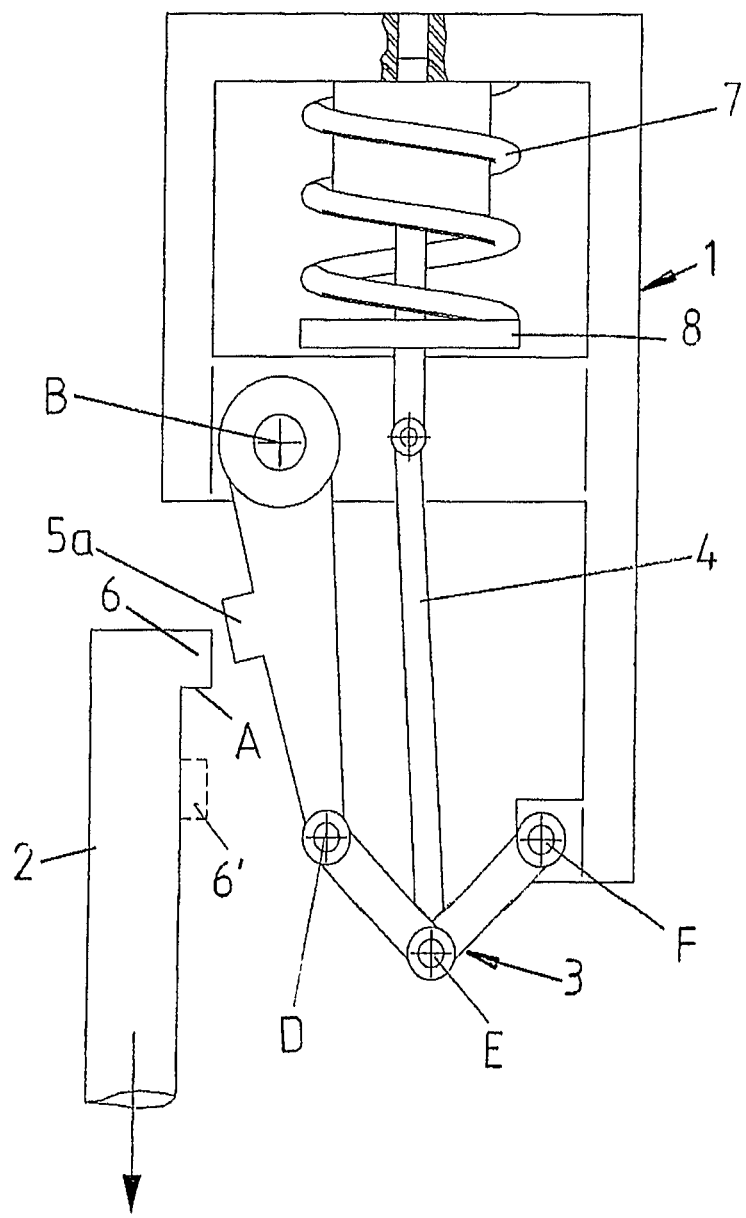
FIG. 2 is a corresponding view showing a position where the second mechanical member has been released by the coupling mechanism.

In FIG. 2 is shown schematically the mechanism according to FIG. 1 after disconnection has been effected, whereby the control rod 4 has been urged downwards, possibly by aid of the resilient member 7, whereby the knee joint E has caused the link members to be folded, thereby pulling the end D of the second link member 3b towards the fixed end F of the first link member 3a, resulting in that the hook 5a of the hook arm 5 has been pulled out from engagement with the shoulder 6.

For getting the best possible reliability regarding the disconnection function, the release function is arranged to work in two different ways.

In the first case the hook arm 5 will open immediately after the control rod 4 stops to keep the knee link members 3a, 3b in a substantially straight position. This is valid when the contact angle α minus the friction angle (arctan [μ]) in the contact A between hook arm 5 and shoulder 6 is more than 0°. The relation between effective arm length "Y" and the prefold distance "X" is closely connected to the required holding force. The required holding force increases with increased ratio X:Y. When X:Y=0, no holding force is required, but at the same time, the mechanism will not be self-opening any longer. Theoretically a ratio X:Y=0 can be used, but it may be critical in use as it can result in a negative pre-fold if influence from tolerances and wear should go the wrong way.

In the second case, if the effective angle (α—friction angle) is zero to negative, the resilient member 7 is needed to force the knee joint to collapse, thereby actively pulling the hook arm 5 away from the shoulder 6. The effect of the ratio X:Y in this case is as a force amplifier. The inverse ratio Y:X represents the amplification of the disconnection force divided by a factor 2. If X=0, the amplification will theoretically be infinite, but in practice, play and elasticity in components and structure will reduce the amplification. The optimal ratio depends on the α used, expected friction values and additional friction in joints between hook arm 5, control rod 4 and the knee link members 3a, 3b.

Figure 3:
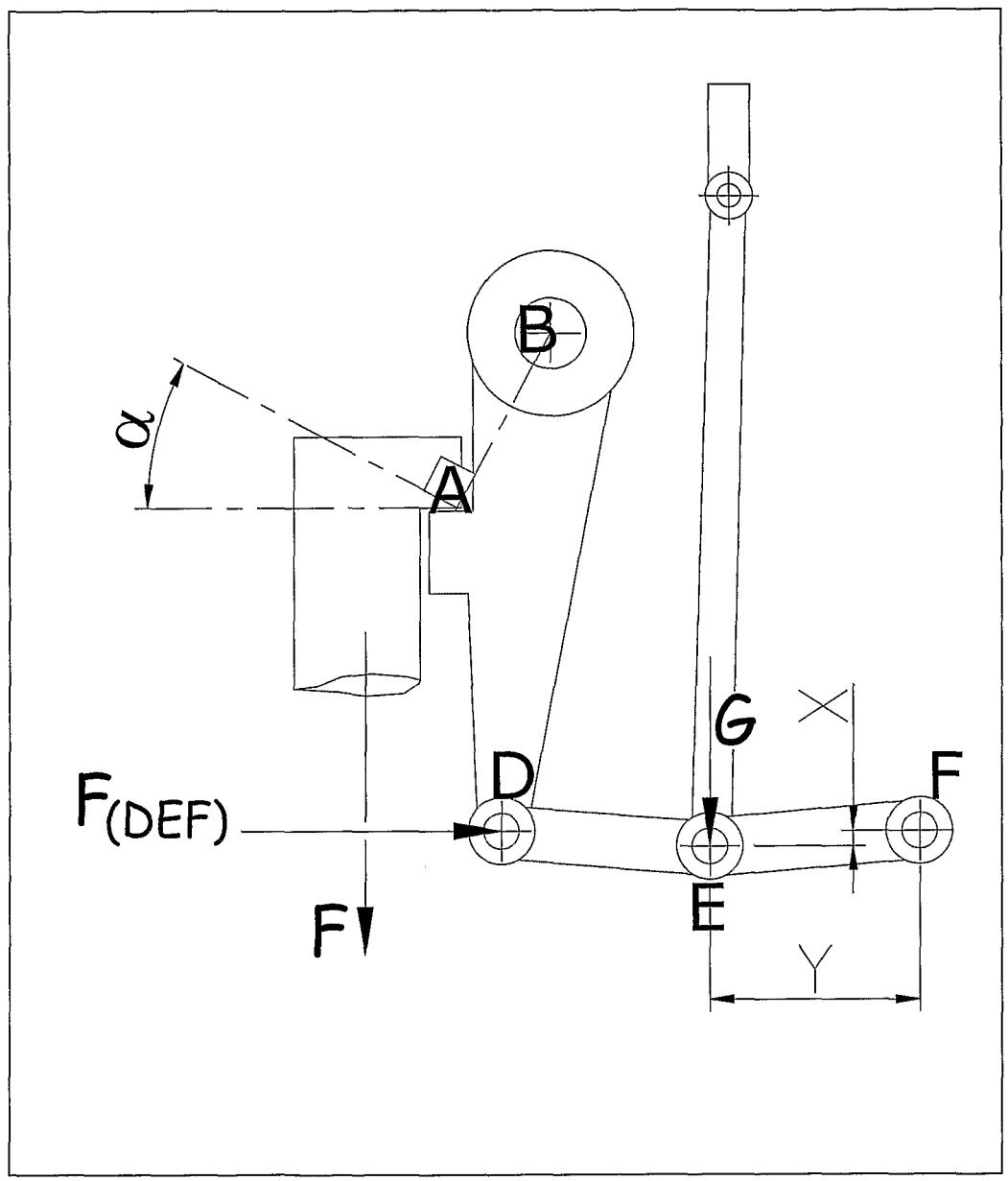
FIG. 3 illustrates schematically principal functions and forces of the coupling mechanism.

The following equations satisfy this, and by changing the parameter, it is possible to create an optimized "operational window". In FIG. 3 the principal functions and forces of the coupling mechanism are shown schematically.

$$F_{DEF} = \frac{BA}{BD}\left\{F\left[\tan(\alpha - \arctan(\mu A)) - \frac{r_B \times \mu_B}{BD}\right]\right\}. \quad \text{Equation 1}$$

$F_{(DEF)}$: Force acting on hook arm and the joints D, E & F. Positive value creates an opening turn of the hook arm.
BA: Lever from joint B to contact A
BD: Perpendicular (effective) lever from joint B to joint D
F: Force from shoulder put on the hook arm
$\mu_A$: Friction coefficient in the contact between shoulder and hook arm
α: Contact angle in point A
$r_B$: Radius of axis in joint B
$\mu_B$: Friction coefficient in joint B $$G = F_{DEF}\frac{(3 \times \mu_{DEF} \times r_{DEF} - 2 \times X)}{\sqrt{DE^2 - X^2}} \quad \begin{array}{r}\text{(valid for first case)} \quad \text{Equation 2}\end{array}$$

Figure 4:
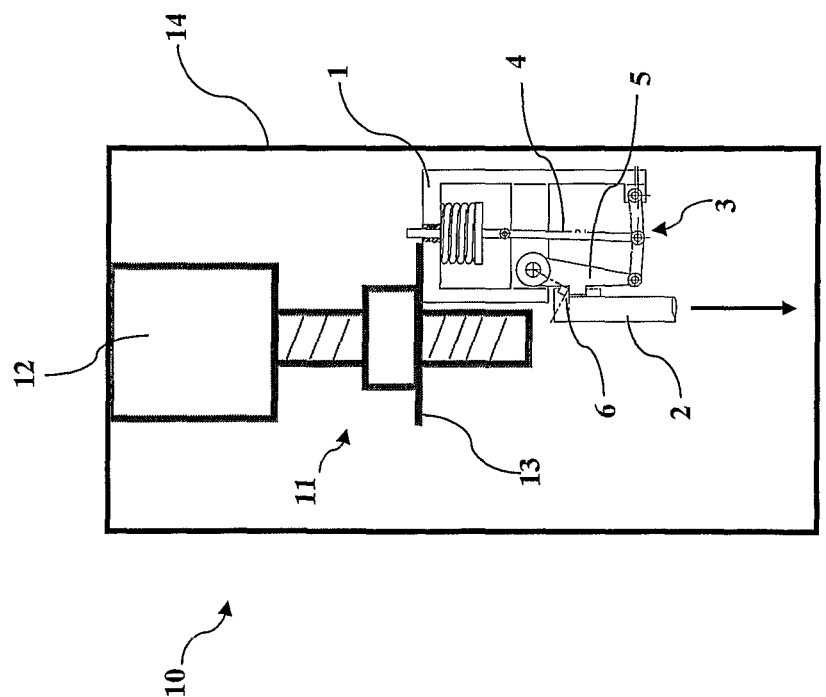
FIG. 4 illustrates schematically a linear actuator according to a further aspect of the invention equipped with a coupling mechanism according to the first aspect of the invention.

G: Force to fold/collapse the knee and move the hook arm 5 away from the shoulder 6. Negative value means that the force instead has to hold the knee to prevent it from fold/collapse by itself.
X: Pre-fold distance of knee links
DE: Knee link length. DE is supposed to be of equal length as link FE
$r_{DEF}$: Radius of axis in joint D, E & F
$\mu_{DEF}$: Friction coefficient in joints D, E & F In FIG. 4 is shown schematically a linear actuator 10 comprising a coupling mechanism. The linear actuator 10 further comprises a nut and screw arrangement 11, which in this embodiment may be driven by a motor 12, which is connected to a housing 14. The coupling mechanism is fixed to the nut and screw arrangement 11 by a fixing means 13, and it is thus possible to drive the coupling mechanism to a desired position within the linear actuator. The coupling mechanism comprises a first mechanical member 1, with a knee joint 3, acted upon by a control rod 4, and a second mechanical member 2 which is also part of the actuator. The second mechanical member 2 may for instance be an actuation rod or an actuation element, or a means for connecting to an actuation rod or actuation element. The coupling mechanism comprises a hook arm 5 that is engaged with the second mechanical member 2 via at least one shoulder 6, and thus connects the second mechanical member 2 to the nut and screw arrangement 11. Thus, it is possible to control the movement of the second mechanical member 2 by driving the nut and screw arrangement 11. However, it is sometimes required to perform an emergency operation, e.g. very quickly close or open a valve or the like, raise or lower a member etc.

Consequently, the hook arm 5 is arranged to be disconnected from the second mechanical member 2 when an emergency operating function shall be executed. In this embodiment, the second mechanical member 2 is acted upon by an energized spring (not shown). If an emergency operation is needed, the hook arm 5 is disconnected from the second mechanical member 2, and the spring causes the second mechanical member to perform a translating movement away from the coupling mechanism. In order to re-load the linear actuator 10, the motor 12 may drive the nut and screw arrangement 11 and thus the coupling mechanism towards the second mechanical member 2. The coupling mechanism may then connect to the second mechanical member 2 by engaging the hook arm 5 and the shoulder 6. When connected, it is possible to drive the nut and screw arrangement 11 in the opposite direction, thus causing the coupling mechanism and the second mechanical member 2 to move in the same direction to a desired position, while at the same time also loading/energizing the spring again.

The invention is not limited to the embodiments illustrated in the accompanying drawings and described with reference thereto, but modifications and variants are possible within the scope of the accompanying drawings.

The invention claimed is:

1. A coupling mechanism for releasably interconnecting first and second mechanical members, the mechanical members being longitudinally movable in relation to each other, the coupling mechanism comprising:
   a knee link mechanism including a first link member having an end pivotally supported on the first mechanical member and a second link member pivotally connected to the first link member so as to form a knee joint,
   a control rod pivotally connected to the knee joint, and
   a hook arm having an end pivotally connected to the second link member and an opposite end pivotal about a support point, the support point being stationary relative to the first mechanical member, the hook arm having a hook facing the second mechanical member, the hook being in mechanical engagement with a shoulder of the second mechanical member when a holding force exerted on the first mechanical member retains the control rod stationary such that the knee joint is kept in a substantially stretched position by the control rod and the control rod displacing the knee joint such that the hook of the hook arm is pulled out of engagement with the shoulder of the second mechanical member when the holding force is lesser than a threshold value.

2. The coupling mechanism as claimed in claim 1, further comprising
   one of an electromagnet, a pneumatic actuator and a hydraulic actuator configured to generate the holding force, and
   a device configured to release the second mechanical member when the holding force is lesser than the defined threshold value.

3. The coupling mechanism as claimed in claim 1, wherein the shoulder of the second mechanical member is positioned relative to the hook such that the coupling mechanism is configured to counteract a force in a pull direction generally toward the support point of the hook arm.

4. The. coupling mechanism as claimed in claim 1, wherein the shoulder of the second mechanical member located relative to the hook such that the coupling mechanism is configured to counteract a force in a push direction generally away from the support point of the hook arm.

5. The coupling mechanism as claimed in claim 1, wherein the control rod has a resilient means for increasing a releasing force acting through the control rod on the knee joint.

6. The coupling mechanism as claimed in claim 5, wherein the resilient means is a spring.

7. A linear actuator comprising:
   a nut and screw arrangement,
   a motor for driving the nut and screw arrangement,
   a first mechanical member fixed to the nut and screw arrangement,
   a second mechanical member, and
   a coupling mechanism releasably connecting the first and second mechanical members and including:
     a knee link mechanism including a first link member having an end pivotally supported on the first mechanical members and a second link member pivotally connected to the first link member so as to form a knee joint,
     a control rod pivotally connected to the knee joint, and
     a hook arm having an end pivotally connected to the second link member and an opposite end pivotal about a support point, the support point being stationary relative to the first mechanical member, the hook arm having a hook facing the second mechanical member, the hook being in mechanical engagement with a shoulder of the second mechanical member when a holding force exerted on the first mechanical member retains the control rod stationary such that the knee joint is kept in a substantially stretched position by the control rod and the control rod displacing the knee joint such that the hook of the hook arm is pulled out of engagement with the shoulder of the second mechanical member when the holding force is lesser than a threshold value.

* * * * *